(12) United States Patent
Gregg et al.

(10) Patent No.: US 6,228,159 B1
(45) Date of Patent: May 8, 2001

(54) MULTI-COMPONENT MIXTURES FOR MANUFACTURE OF SEMI-CONDUCTORS

(75) Inventors: John N. Gregg, Marble Falls; Robert M. Jackson, Burnet, both of TX (US)

(73) Assignee: Advanced Delivery & Chemical Systems, Ltd., Austin, TX (US)

( * ) Notice: Subject to any disclaimer, the term of this patent is extended or adjusted under 35 U.S.C. 154(b) by 0 days.

(21) Appl. No.: 09/476,080

(22) Filed: Dec. 30, 1999

Related U.S. Application Data

(62) Division of application No. 08/856,660, filed on May 15, 1997, now Pat. No. 6,030,445.

(51) Int. Cl.$^7$ .................................................. C09B 183/00
(52) U.S. Cl. ........................................................ 106/287.14
(58) Field of Search ........................... 106/287.14, 287.16

(56) References Cited

U.S. PATENT DOCUMENTS 4,755,486 * 7/1988 Treichel et al. ...................... 437/164
4,849,259 * 7/1989 Biro et al. .......................... 427/248.1

OTHER PUBLICATIONS

Chemical Abstract AN 1989:607256, Becker et al, "Low pressure deposition of doped . . . ".*
Chemical Abstract AN 1990:203674, Kyota, "Vapor deposition of arsenic silicate glass", 1989.*

* cited by examiner

*Primary Examiner*—David Brunsman
(74) *Attorney, Agent, or Firm*—O'Keefe, Egan & Peterman, LLP

(57) ABSTRACT

This invention concerns a stable composition useful in the manufacture of semiconductors, comprising a liquid mixture of: octomethylcylcotetrasilane and a triethoxy arsenic compound.

4 Claims, No Drawings

MULTI-COMPONENT MIXTURES FOR MANUFACTURE OF SEMI-CONDUCTORS

This application is a divisional of application Ser. No. 08/856,660, filed May 15, 1997 now U.S. Pat. No. 6,030,445.

BACKGROUND OF INVENTION

This invention generally pertains to multicomponent liquid mixtures including tetraethylorthosilicate, triethylborate, and triethylphosphorus compound.

In the manufacture of semiconductor devices, it is often desirable to dope a silicon layer or structure with boron and phosphorus. Historically, such doping has been performed from separate high purity containers and by co-deposition of boron and phosphorus oxides. More recently, there have been efforts to combine a typical source of silicon, such as tetraethylorthosilicate (TEOS) with trimethylborate and trimethylphosphite to provide a mixture used as a reactant source to directly form borophosphosilicate glass. This mixture had several problems, including transesterification of the components and significant depletion effects, as described by R. A. Levy et al., *J. Electrochem. Soc.*, Volume 134, Number 7, pages 1744–1749 (July, 1987). It was reported that the depletion effects resulted in a fairly rapid decrease in thickness and phosphorus content of the films along the length of the reaction chamber. The authors of this article proposed moving away from TEOS as a reactant, instead employing diacetoxyditertiarybutoxysilane (DADBS) as the reactive component for silicon. However, TEOS continues to be the most commonly used compound for silicate deposition.

Furthermore, other industry trends that promote the use of cocktail mixtures include the growing need for single wafer deposition systems and the use of liquid mass flow controllers (LMFC) for 300 millimeter wafers. LMFCs are used instead of bubblers and simple vapor delivery systems for the transport of the needed dopants to the deposition chamber. Cocktail mixtures are not feasible in bubbler or vapor delivery systems due to the differences in vapor pressures of the individual components of the mixture. The composition of the vapor flow will vary in concentration as the cocktail is consumed and will not result in a repeatable, manufacturable process. Several other issues make bubblers and vapor delivery less desirable and expensive, namely, the poor performance of vapor MFCs due to temperature dependency and condensation issues; temperature controllers for each individual source; expensive "hot boxes" that are required; temperature control of all delivery lines, valves, MFCs, and the like. Similarly, a syringe pump and a controlled leak methodology are not as accurate, have moving parts (particle generator), require frequent maintenance for seal replacement, and have no feedback controls for automation.

On the other hand, LMFCs have been found to be simpler and more controlled. The pure liquid or cocktail mixture is transported to the LMFC where the exact flow is controlled. The use of cocktails in an LMFC is desirable since they are not boiling point dependent, LMFCs do not produce particles during operation, and since LMFCs are considered to be more accurate than syringes. The liquid is then flash vaporized very near to the chamber and delivered via a "transport" gas to the wafer surface. The flash vaporizer is capable of handling multi-component mixtures with no known problems. Accordingly, choice of dopant is not determined by its boiling point, but instead on reactivity and stability. It is expected that use of LMFCs will continue to expand as the film requirements become more strict. The film requirements are a function of the need for thinner films as well as the need to provide repeatability and uniformity for 300 mm wafer processes.

The inventor herein has recognized that a need exists for a multicomponent mixture to serve as a feed stock for borophosphosilicates during semiconductor fabrication. This need is particularly timely given the recent trend toward use of LMFCs during semiconductor fabrication. Such a multicomponent mixture would provide a number of benefits such as simplified delivery systems requiring a single channel for doped silicon oxide production; reduction of process variables due to the simplified system; improved system reliability (i.e., mechanical pumps not being exposed to pure trimethylborate and trimethylphosphite flow during wafer transport), fixed stoichiometry of the reactants which makes the chemical source less dependent on exact calibration of flow controllers, pressures, and efficiency of mixing, and less chemicals to handle.

SUMMARY OF INVENTION

This invention provides a solution to one or more of the needs, disadvantages, and shortcomings described above.

In one broad respect, this invention is a composition useful in the manufacture of semiconductors, comprising a liquid mixture of: tetraethylorthosilicate, triethylborate, and a triethylphosphorus compound. The tetraethylorthosilicate, triethylborate, and triethylphosphorus compound may be present in amounts effective to provide a borophosphosilicate that is formed on a substrate by plasma deposition that contains boron and phosphate in a percentage ratio of about 5/5, about 5/3, about 3/3, about 4/4, or about 3/6. In one embodiment of this invention, the components of the liquid mixture each have a purity of at least 99.99%. In one embodiment of this invention, the liquid mixture comprises (a) from about 60% to about 80% tetraethylorthosilicate, (b) from about 15% to about 30% triethylborate, and (c) from about 4% to about 10% triethylphosphorus compound, and wherein the percentages are measured by weight and total 100% for components (a), (b), and (c). In another embodiment of this invention, the liquid mixture may further comprise a triethoxyarsenic compound, such as triethoxy arsenate.

In a second broad respect, this invention is a composition useful in the manufacture of semiconductors, comprising a liquid mixture of: (a) from about 60% to about 80% tetraethylorthosilicate, (b) from about 15% to about 30% triethylborate, and (c) from about 4% to about 10% triethylphosphate, wherein the percentages are measured by weight and total 100% for components (a), (b), and (c).

In a third broad respect, this invention is a method useful for the preparation of a liquid mixture useful in the manufacture of semiconductors, comprising the steps of: obtaining (a) tetraethylorthosilicate, (b) triethylborate, and (c) a triethylphosphorus compound; combining components (a), (b), and (c) and mixing the components to form the liquid mixture. In one embodiment, the mixing step occurs prior to adding the components to the container.

In yet another broad respect, this invention is a stainless steel canister containing tetraethylorthosilicate, triethylborate, and a triethylphosphorus compound. In one embodiment of this invention, the canister has a capacity of from about 1 to about 50 liters. These canisters may be shipped in approved shipping crates.

Advantageously, the liquid mixture of this invention is stable, and does not undergo transesterification or form by-products during proper storage. Furthermore, this composition does not suffer the depletion effects of the aforementioned TEOS, trimethylborate, and trimethylphosphite mixture. This invention, therefore, provides a single mixture effective in the manufacture of in situ doped borophosphosilicate during semiconductor manufacture, unlike the prior art. This invention thus overcomes the difficulties and problems inherent in the prior art. This invention, moreover, enables use of simplified delivery systems resulting in a reduction in process variables and reduced dependence on calibration of flow controllers, pressures, and efficiency of mixing compared to the prior art.

DETAILED DESCRIPTION OF THE INVENTION

The tetraethylorthosilicate, $Si(OC_2H_5)_4$, employed in this invention is a well known compound which is available commercially. For example, high purity TEOS is available from a variety of sources such as Advanced Delivery and Chemical Systems, Ltd. in Austin, Tex. In the practice of this invention, it is generally desirable to use TEOS at least 95% pure, with 99.99% or more pure TEOS being more preferable.

Triethylborate is also a well known, commercially available material. High purity triethylborate is available from a variety of sources, such as Advanced Delivery and Chemical Systems, Ltd. In the practice of this invention, it is generally desirable to use triethylborate of at least 95% purity, with 99.99% or more pure triethylborate being more preferable.

The triethylphosphorus compounds used in this invention may be any phosphorus compound having ethyl substituents which will lead to in situ doped silicon oxide through use of the composition of this invention. Representative examples of such triethylphosphorus compounds include triethylphosphate and triethylphosphite. Generally, triethylphosphate is more desirable in the practice of this invention, as is triethylphosphorus compounds of at least 95% purity. More desirably, 99.99% or higher purity triethylphosphorus compounds are employed in practice of this invention. High purity triethylphosphite and triethylphosphate are available commercially from a variety of sources, such as Advanced Delivery and Chemical Systems, Ltd.

The composition of this invention may be readily prepared by simple mixing. For instance, exact amounts of TEOS, triethylborate, and triethylphosphorus compound may be sequentially added to a canister. The flow of the components typically effects mixing. If desired, the canister can also be shaken or the like to thoroughly mix the components. Alternatively, the components can be fed concurrently into a canister, so that mixing occurs simultaneous with the components addition to the storage vessel. Likewise, the components can be admixed and then fed to the canister. Since TEOS, triethylborate, and triethylphosphorus compound react with water, it is advisable to handle the components and mixture under dry conditions.

During use, the composition of this invention may be used as the silane source in a conventional deposition apparatus, such as chemical vapor deposition apparatus and low pressure chemical vapor deposition. Generally, deposition of the borophosphosilicate occurs by decomposition of the reactants in a plasma reactor with a heated substrate. By this process, silicon dioxide in situ doped with boron and phosphorus is deposited on a given substrate.

It has been found that there is not a direct correlation between the amount of boron and phosphorus in the multi-component composition to the amounts of boron and phosphorus in the borophosphosilicate produced during use of the composition of this invention. For example, in a Novellus Concept One plasma enhanced CVD system employing a total flow rate of 2.1 grams/minute at 0.50 Watt/cm$^2$ and 13.56 MHz, it has been found that if the desired percentage of boron and phosphorus in the final product is 3% and 6%, respectively, then the liquid mixture needs to contain 14.9 percent by weight triethylborate (TEB) and 10.04 percent by weight triethylphosphate (TEPO). The liquid mixture thus would have 19.8 mole percent boron and 11.04 mole percent phosphorus. It should be appreciated that the exact proportions of components in the liquid mixture of this invention needed to provide a selected percentage ratio in the resulting borophosphosilicate may vary depending on a number factors, such as reactor design (e.g., differences in final composition may be influenced by reactor design), plasma density (which is a function of RF power and wafer size), pressures, wafer temperature, residence time, and apparatus size. These factors are well known to one of skill in the art, and are readily controlled.

While these factors may affect final composition of the borophosphosilicate, a desired final composition can be readily correlated to a starting liquid mixture by inputting data points to produce a linear regression. Once a linear regression is established, it can be used to determine the molar ratio of the mixture. Likewise, a given final composition can be achieved by varying the individual components until a desired final composition is achieved. Generally, the procedure would involve varying the individual component amounts until the correct molar percentage is achieved, adding the mixture to a canister, installing the canister on a given deposition apparatus, flushing the system, making the depositions, and analyzing the resulting film.

An advantage of the composition of the present invention is the stability of the liquid mixture. Compositions of this invention were subjected to proton nuclear magnetic resonance (nmr) analysis at varying times after preparation of a liquid mixture, with no change or addition to molecular structure having been observed. Similarly, gas chromatography over a three month period of liquid mixtures of this invention showed that the mixture was stable with no by-products being observed.

Representative examples of liquid mixture composition percentages that correspond to selected boron/phosphorus ratios of the borophosphosilicate produced in the above-referenced plasma enhanced CVD system are shown in Table 1 hereinbelow, wherein all percentages are by weight.

The compositions of this invention may optionally include a triethoxyarsenic compound. Alternatively, the triethoxyarsenic compound may be employed alone with TEOS in the absence of TEB and the triethylphosphorus compound. A liquid mixture containing TEOS and triethoxyarsenic compound will form an arsenic silicate glass ("AsSG"). Triethoxyarsenic compounds are well known and are commercially available. Representative examples of such triethoxyarsenic compounds including triethoxyarsenite and triethoxyarsenate. It is desirable to use triethoxyarsenic compound having a purity of at least about 95%, with a purity of at least about 99.99% being more desirable. It is contemplated that liquid mixtures of this invention that contain such arsenic compounds, which are generally highly toxic, will possess various advantages and benefits. For example, TEOS is more volatile than triethoxyarsenate, and since triethoxyarsenate would be a minor component of the liquid mixture, it is expected that TEOS, for example, will preferentially evaporate from the mixture relative to triethoxyarsenate. Hence, it is believed that the liquid mixture will be less of a hazard, based on volatile organic content of air exposed to the mixture, than the arsenate alone. It is expected that such liquid mixtures will enable the semiconductor fabrication industry to manufacture AsSG from a single, liquid mixture. If employed, the triethoxyarsenic compound may be added in an amount to so that the triethoxyarsenic compound makes up from about 0.1 percent by weight to about 10 percent by weight of the liquid mixture, based on the total weight of the liquid mixture.

It is contemplated that it may be possible to employ octomethylcyclotetrasilane (OMCATS) in combination with, or in place of, TEOS as the silicon source with alternative dopants.

The following examples are illustrative of this invention and are not intended to be limiting as to the scope of the invention or claims hereto. Unless otherwise specified, all percentages are by weight.

EXAMPLES 1–13

Preparation of Three-Component Liquid Mixtures and Manufacture of Borophosphosilicate After measuring appropriate amounts in a quartz bubbler under anhydrous conditions, TEOS, TEB, and TEPO were each sequentially flowed into a stainless steel canister in the percentages described in Table 1. The final composition of the borophosphosilicate produced by plasma enhanced CVD at 13.56 MHz and 0.5 Watt/cm$^2$ and a flow rate equal to 2.1 grams/minute using each of the compositions is set forth.

TABLE 1

| Example | LIQUID MIXTURE (wt %) | | | B/P (wt %/wt %) RATIO IN BOROPHOSPHOSILICATE |
|---|---|---|---|---|
| | TEOS | TEB | TEPO | |
| 1 | 76.7 | 16.8 | 6.41 | 3.35/3.65 |
| 2 | 75.3 | 15.2 | 9.55 | 1.7/3.5 |
| 3 | 73.2 | 19.9 | 6.87 | 3.9/4.3 |

TABLE 1-continued

| Example | LIQUID MIXTURE (wt %) | | | B/P (wt %/wt %) RATIO IN BOROPHOSPHOSILICATE |
|---|---|---|---|---|
| | TEOS | TEB | TEPO | |
| 4 | 73.3 | 19.9 | 6.76 | 3.9/4.0 |
| 5 | 64.8 | 28.7 | 6.48 | 5.49/3.56 |
| 6 | 71.3 | 24.5 | 4.15 | 5.22/2.87 |
| 7 | 70.77 | 24.5 | 4.7 | 5.0/2.9 |
| 8 | 72.97 | 22.7 | 4.31 | 4.9/2.5 |
| 9 | 60.0 | 28.5 | 11.5 | (4.6 to 6.5)/(5.1 to 6.1) |
| 10 | 68.2 | 23.5 | 8.26 | 4.56/5.14 |
| 11 | 70.3 | 21.7 | 8.03 | 4.95/5.0 |
| 12 | 71.9 | 20.6 | 7.53 | 4.6/4.55 |
| 12 | 74.7 | 14.9 | 10.41 | 2.86/6.32 |

The liquid mixtures employed in Examples 1–13 were analyzed by NMR and found to be stable, with no change or addition to molecular structure being observed. Likewise, gas chromatography analysis over a three month period revealed stable mixtures and no observed by-products. Thus, these compositions have significantly improved properties over prior compositions, such as a TEOS, TEB, and TEPO composition. These mixtures were added to stainless steel canisters (2000 gram fill) prior to use.

What is claimed is:

1. A composition useful in the manufacture of semiconductors, comprising a liquid mixture of octomethylcyclotetrasilane and a triethoxyarsenic compound.

2. The composition of claim 1, wherein the triethoxyarsenic compound is triethoxy arsenate.

3. The composition of claim 2, wherein the triethoxy arsenate is present in an amount of from about 0.1 percent by weight to about 10 percent by weight.

4. The composition of claim 1, wherein the ethoxyarsenic compound is present in an amount of from about 0.1 percent by weight to about 10 percent by weight.

* * * * *